United States Patent
Neuroth et al.

[11] Patent Number: 6,143,988
[45] Date of Patent: Nov. 7, 2000

[54] COILED TUBING SUPPORTED ELECTRICAL CABLE HAVING INDENTATIONS

[75] Inventors: David H. Neuroth, Tulsa; Larry Dalrymple; Earl B. Brookbank, both of Claremore; Tim W. Pinkston, Chelsea, all of Okla.; Don C. Cox, Roanoke, Tex.

[73] Assignee: Baker Hughes Incorporated, Houston, Tex.

[21] Appl. No.: 09/019,139

[22] Filed: Feb. 6, 1998

Related U.S. Application Data

[60] Provisional application No. 60/047,630, May 23, 1997.

[51] Int. Cl.$^7$ .............................. H01B 9/06; F16L 9/18; E21B 23/00
[52] U.S. Cl. ................... 174/105 R; 174/28; 138/113; 166/385
[58] Field of Search .................. 174/28, 105 R, 174/131 R, 47; 138/112, 113, 114, 121; 166/385

[56] References Cited

U.S. PATENT DOCUMENTS

| | | | |
|---|---|---|---|
| 2,140,270 | 12/1938 | Potter | 174/105 R |
| 4,252,992 | 2/1981 | Cherry et al. | 174/90 |
| 5,051,108 | 9/1991 | Lincoln | 439/825 |
| 5,191,173 | 3/1993 | Sizer et al. | 174/105 R |
| 5,269,377 | 12/1993 | Martin | 166/385 |
| 5,435,351 | 7/1995 | Head | 138/111 |
| 5,803,127 | 9/1998 | Rains | 138/113 |
| 5,821,452 | 10/1998 | Neuroth et al. | 174/28 |

FOREIGN PATENT DOCUMENTS

| | | |
|---|---|---|
| 637115 A1 | 2/1995 | European Pat. Off. . |
| 297947 | 10/1928 | United Kingdom . |
| 729695 | 5/1955 | United Kingdom . |

*Primary Examiner*—Kristine Kincaid
*Assistant Examiner*—Chau N. Nguyen
*Attorney, Agent, or Firm*—James E. Bradley

[57] ABSTRACT

An electrical line for installation in a well for transmitting power to a well pump includes a string of coiled tubing. An electrical cable having insulated electrical conductors embedded within an elastomeric jacket extends longitudinally through the interior passage of the tubing. Retainers are mounted to the electrical cable and spaced longitudinally apart from each other. An indentation is integrally formed in the tubing adjacent each of the retainers. Each indentation protrudes into the interior passage of the tubing and creates a ledge which is contacted by one of the retainers when the electrical line is installed in the well. The indentations and retainers transfer weight of the electrical cable to the tubing. Weld material is filled into the depression on the surface created by each indentation.

33 Claims, 2 Drawing Sheets

COILED TUBING SUPPORTED ELECTRICAL CABLE HAVING INDENTATIONS

This application claims benefit of provisional application No. 60/047,630 filed May 23, 1997, now abandoned.

TECHNICAL FIELD

This invention relates in general to power cable for electrical submersible well pumps and in particular to an electrical cable installed within a string of coiled metal tubing.

BACKGROUND ART

Conventional electrical submersible well pumps for oil and deep water wells are supported on a string of production tubing. The production tubing comprises sections of steel pipe screwed together, each section being about thirty feet in length. The pump is a centrifugal pump driven by an AC motor located below the pump. A power cable extends from the surface alongside the tubing for supplying power to the motor. The power cable is strapped to the tubing at frequent intervals to support the weight of the power cable.

One disadvantage of the conventional pump assembly described above is that when the pump must be pulled for repair or replacement, the procedure is expensive. The operator needs a workover rig with the capability of pulling the sections of tubing. Pumps of this nature must be pulled typically at least every eighteen months. Considering the cost of the workover rig as well as the down time for the well, the periodic expense is significant.

A few installations have been made employing coiled tubing. Coiled tubing is a continuous string of metal tubing which is brought to the well site on a large reel. The coiled tubing unit unreels the tubing and forces it into the well. Coiled tubing has been used for various purposes in the past, and recently used to suspend electrical submersible pumps. An advantage of a coiled tubing supported pump is that it does not need a workover rig to pull it. Also, pulling and replacing it should be faster than production tubing.

One proposal in the past was to produce production fluid from the pump through the coiled tubing and strap the cable to the exterior of the coiled tubing. A disadvantage of this assembly is that a separate reel is needed for the power cable. Securing the straps would slow down the installation and pulling procedure. Furthermore, commercially available coiled tubing is not large enough in diameter for desired production in many cases.

Some installations have been made with the electrical cable installed within the coiled tubing. Production fluid from the pump flows through a casing surrounding the coiled tubing. The electrical cable is a three-phase cable having fairly large metal conductors. The weight of the cable is such that it will not support itself in a deep well. Even if inserted within coiled tubing, the weight of the electrical cable needs to be supported by the coiled tubing. In one type of installation, separate mechanical anchors are spaced along the length of the insulated electrical cable. The cable is inserted into the coiled tubing with the anchors retracted. The anchors are then shifted to a weight supporting position, gripping the inner diameter of the coiled tubing. U.S. Pat. 5,435,351, Head, Jul. 25, 1995, describes such a system.

Another proposal shown in U.S. Pat. 5,191,173, Sizer et al, Mar. 2, 1993, describes using an elastomeric jacket of a type that will swell when exposed to a hydrocarbon liquid. The jacket is extruded over the insulated conductors during manufacturing. The jacketed electrical cable is then inserted into the coiled tubing. Then liquid hydrocarbon is pumped into the annular space surrounding the jacket, causing it to swell to frictionally grip the coiled tubing. In another embodiment, metal sleeves are bonded to the cable. After installation, the coiled tubing and sleeves are crimped to each other.

DISCLOSURE OF INVENTION

The coiled tubing of this invention has indentations formed in the sidewall to create ledges for supporting elements within such as an electrical cable. In the case of electrical cable, it is supported within the coiled tubing by retainers on the cable which are supported on indentations in the coiled tubing. The retainers are secured to the exterior of the electrical cable at various points. The retainers have an outer diameter that is less than the inner diameter of the coiled tubing to allow the electrical cable to be inserted into the coiled tubing. Subsequently, the retainers are located and indentations are placed in the coiled tubing next to the retainer.

Each indentation is a dimple which protrudes inward sufficiently to create a ledge which interferes with movement of the retainer. This causes the retainer to rest on the ledge, transferring load of the cable weight to the coiled tubing. Preferably, a first set of at, least three indentations are spaced just below each of the retainers. A second set is positioned a short distance below the first set. The second set provides support in the event the first set allows slippage after several trips of the cable in and out of the well. Also, preferably, the outside of each of the dimples is filled with weld material to reduce the tendency for the coiled tubing injector from flattening the dimples.

BEST MODE FOR CARRYING OUT THE INVENTION

Figure 1:
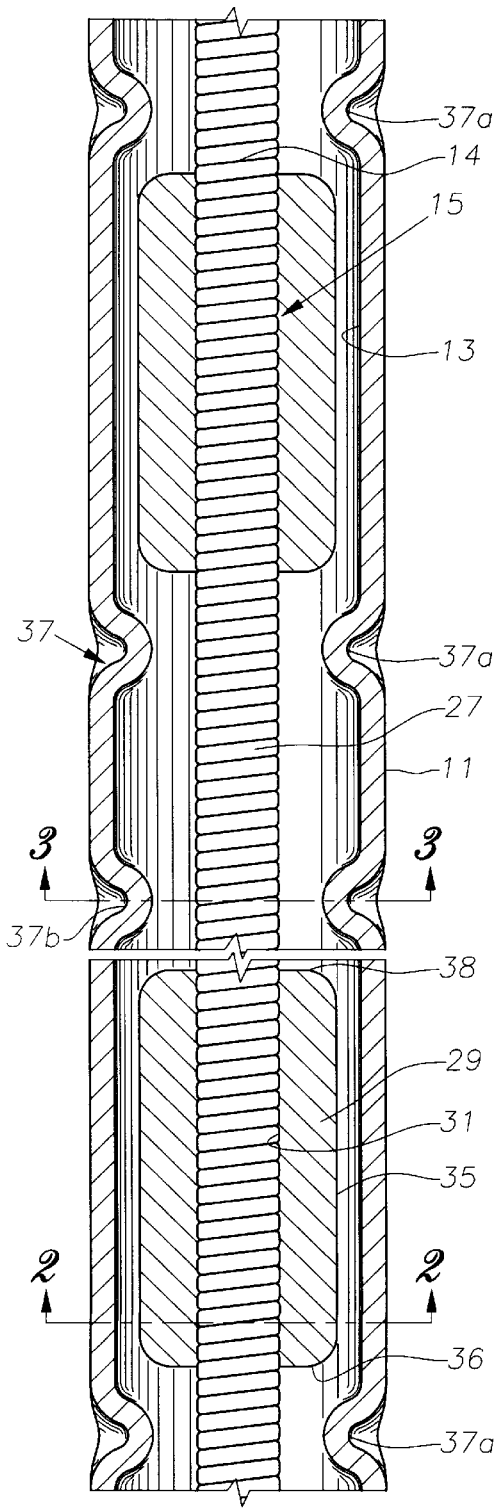
FIG. 1 is a partial sectional view taking along line 1—1 of FIG. 3 and illustrating an electrical cable and coiled tubing assembly constructed in accordance to this invention.

Referring to FIG. 1, the electrical power line for a submersible pump includes a string of continuous coiled tubing 11. Coiled tubing 11 is steel, has an inner diameter 13, a longitudinal axis 14 and is of conventional materials and dimensions. Coiled tubing 11 is capable of being wound on a large reel for transport to a well site, then forced into the well. An electrical cable 15 is shown inserted through the length of coiled tubing 1 1. Electrical cable 15 is a type particularly for supplying AC power from the surface to a downhole motor for driving a centrifugal pump (not shown) which is located at the lower end of coiled tubing 11.

Figure 2:
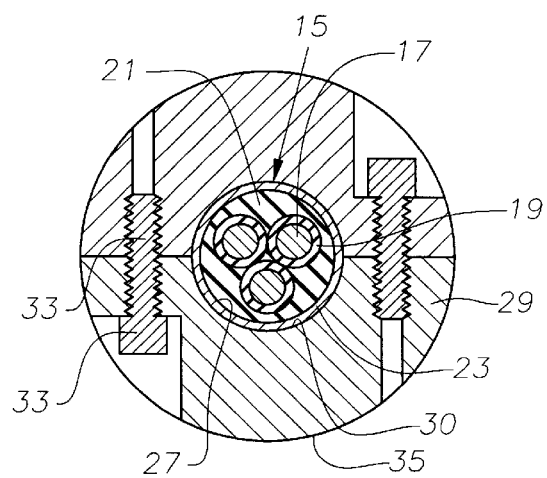
FIG. 2 is a sectional view of the assembly of FIG. 1, taken along the line of 2—2 of FIG. 1.

As shown in FIG. 2, electrical cable 15 has three conductors 17, each surrounded by an insulation layer 19. An elastomeric jacket 21 is extruded over the three insulated conductors 17. Jacket 21 has a cylindrical outer diameter 23 containing a plurality of parallel longitudinal grooves (not shown). Outer diameter 23 is helically wrapped with a metal strip of armor 27 that is also of metal. In one embodiment, jacket 21 is of a material, such as Nitrile rubber, which resists swelling when exposed to hydrocarbon liquid. In this embodiment, the tightly wrapped armor 27 deforms jacket 21 and provides adequate frictional engagement between jacket 21 and armor 27, preventing slippage due to the weight of power cable 15.

Referring to FIG. 1, a plurality of retainers 29 are mounted to cable 15 at selected intervals. Each retainer 29 is a metal member of at least two portions, preferably two halves. Each half has a semi-cylindrical recess 30, as shown in FIG. 2. The recesses 30 mate with each other to form a circular hole with a diameter which is approximately the same as the outer diameter of armor 27. Furthermore, each recess 30 contains a plurality of helically spaced grooves 31 that form a set of threads. The pitch and configuration of grooves 31 are such that they mate with the strips of helical armor 27. Fasteners 33 are used to secure the two halves of retainer 29 together, defining a sleeve.

Retainer 29 has an outer diameter 35 that is less than coiled tubing inner diameter 13. The annular clearance allows power cable 15 with its retainers 29 to be readily drawn into coiled tubing 11. In a typical instance, coiled tubing 11 will have an outer diameter of 2⅜" and a wall thickness of about 0.159". Retainer 29 will have an outer diameter 35 that is about 0.050" to 0.100" less than inner diameter 13. Each retainer 29 has a downward facing shoulder 36 which is located at the lower end and is perpendicular to the longitudinal axis of tubing 11. Each retainer has an upward facing shoulder 38 which is located at the upper end and is perpendicular to the longitudinal axis 14 of tubing 11. Shoulders 36, 38 are identical, allowing cable 15 to be used in an inverted manner from that shown.

Figure 4:
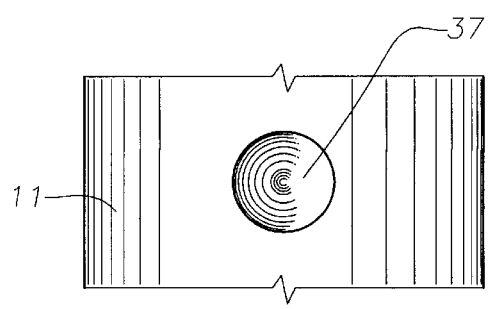
FIG. 4 is a side view of a portion of the coiled tubing of FIG. 1, showing one of the dimples.

To be able to transfer the weight of cable 15 to coiled tubing 11, a plurality of indentations or dimples 37 are formed in coiled tubing 11 after power cable 15 has been installed. Dimples 37 are formed by using a press or punch. Each dimple 37 is generally circular or hemispherical in configuration as shown in FIG. 4, having an axis perpendicular to tubing axis 14, and a diameter of about 0.5 inch. Preferably, each dimple 37 will protrude inward only as far as it needs to for providing a ledge or stop to be engaged by one of the retainers 29. The amount of protrusion is typically about 0.125", which provides at least an interference of 0.025" even if retainer 29 is located off to the far side of dimple 37.

Figure 3:
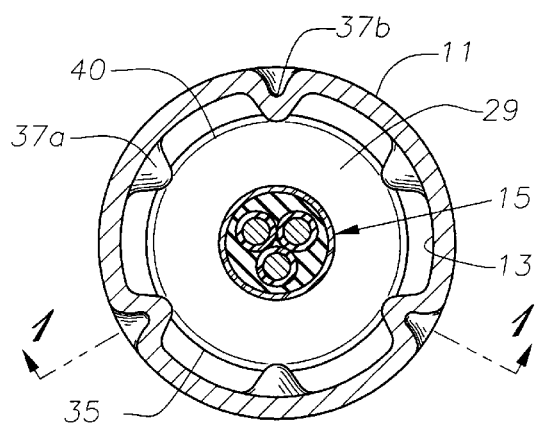
FIG. 3 is a sectional view of the assembly of FIG. 1, taken along the line of 3—3 of FIG. 1.

Preferably there will be three dimples 37 within each set 37a, 37b, as shown in FIG. 3. The dimples 37 within each set 37a, 37b are spaced circumferentially 120 degrees apart from each other in a common plane normal or perpendicular to axis 14. Each set 37a, 37b of dimples 37 circumscribes a diameter 40 which is less than outer diameter 35 of retainer 29.

A primary set 37a of dimples 37 will be located slightly below each load shoulder 36. optionally a primary set 37a of dimples may be located slightly above each retainer 29 so that cable 15 does not need to be oriented in up and down directions. Typically, the spacing between the primary sets 37a of dimples 37 for each retainer 29 will be one to two inches greater than the longitudinal length of retainers 29. Some longitudinal movement of each retainer 29 relative to dimples 37 can thus occur when cable 15 moves from a stretched out horizontal condition during installation of cable 15 in coiled tubing 11 to a coiled condition on a reel and to a linear vertical position in a well.

Also, preferably a secondary set 37b is located about two inches from each primary set 37a, and spaced farther from one of the retainers 29. Dimples 37 in secondary sets 37b are the same as in primary sets 37a, however they are circumferentially staggered from dimples 37 in the adjacent primary set 37a, as shown in FIG. 3. Each dimple 37 in secondary set 37b is located 60 degrees circumferentially from a dimple 37 in primary set 37a. Secondary sets 37b serve as ledges in the same manner as primary sets 37a in the event that any of the primary sets 37a allows slippage to occur after several trips of tubing 11 into the well.

Generally, there will be a retainer 29 about every 300 feet. A typical cable 15 will provide a load on each retainer 29 of about 450 to 750 lbs, which is transmitted through dimples 37 to coiled tubing 11.

In the method of assembly, technicians will install retainers 29 on electrical cable 15 at the selected intervals. The technician secures the two halves of retainers 29 around electrical cable 15, aligning grooves 31 with armor 27. Electrical cable 15 is then inserted within coiled tubing 11. This may be done in one method by pushing a stiff wire from one end of coiled tubing 11 out the other. Then electrical cable 15 will be connected to the protruding end of the rigid wire, and the wire will be winched back onto a reel, drawing electrical cable 15 through coiled tubing 11. Then, the technician will locate the retainers 29 within coiled tubing 11 by ultrasonic scanning or the like. The technician then forms dimples 37 using a press or other type of deformation device.

Coiled tubing 11 with cable 15 installed is then wound on a reel and transported to a well. Coiled tubing 11 is drawn from the reel and a submersible pump and motor (not shown) are attached to the lower end of coiled tubing 11. The lower end of electrical cable 15 is joined to a motor lead of the motor. The assembly is then inserted into the well using a conventional coiled tubing injector. As coiled tubing 11 is inserted into the well, cable 15 will move downward slightly in coiled tubing 11 due to the weight of cable 15. Lower shoulder 36 of each retainer 29 moves into supporting engagement with the lower primary set 37a of dimples 37. The lower primary set 37a of dimples 37 transfers the weight of cable 15 to coiled tubing 11. Coiled tubing 11 supports the weight of the pump and motor. Once at the proper depth, the upper end of electrical cable 15 is connected to a power supply for supplying power to the pump.

The coiled tubing 11 will be pulled from time to time for maintenance or replacement of the pump and motor. After several trips, the ledges created by the dimples 37 tend to flatten due to being squeezed by the coiled tubing injector. If slippage occurs of any of retainers 29 past primary dimple sets 37a, the slipping retainers 29 will contact and be supported by secondary dimple sets 37b.

Figure 5:
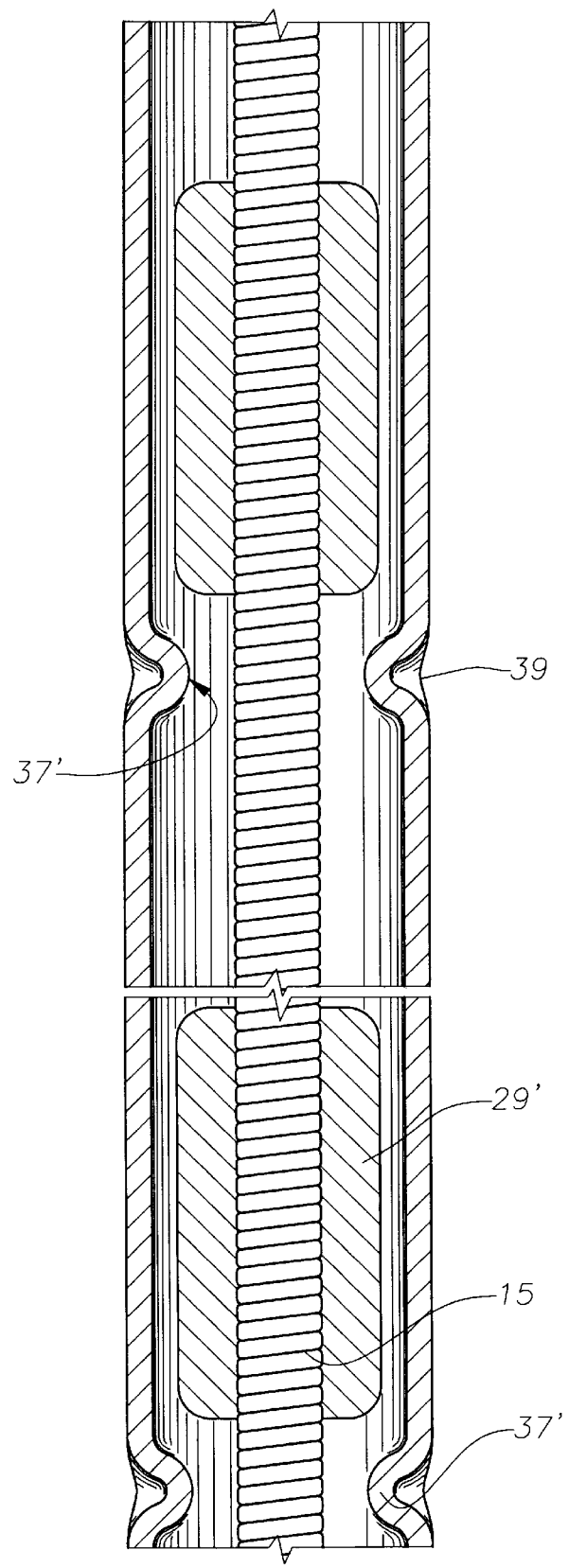
FIG. 5 is a sectional view of an alternate embodiment of an electrical cable in coiled tubing.

In the alternate embodiment of FIG. 5, each dimple 37' creates an exterior depression which is filled with an inlay 39 of rigid material. Preferably, inlay 39 is performed by electric welding, then the weld material is ground smooth. The welding would normally be performed immediately after dimple 37' has been made, thus after power cable 15 has been installed. Inlay 39 creates a hard inward protruding dimple 37 which resists deformation by the coiled tubing injector while being run in and pulled from a well. Other than inlays 39, dimples 37' will be spaced and sized in the same manner as in the first embodiment. In this embodiment, however, there is no need for the secondary dimples 37b as in the first embodiment because inlay 39 resists deformation of the dimple 37. Also, as in the case of the first embodiment, it is optional whether or not to locate a dimple 37' a short distance above each retainer 29'.

The invention has significant advantages. The indentations and retainers provide support for the weight of the cable. The retainers are simple in construction and inexpensive, avoiding complex anchoring mechanisms that have to be internally set after the cable has been inserted into the coiled tubing. The indentations allow a number of trips into and out of the well. before replacement is needed.

While the invention has been shown in only one of its forms, it should be apparent to those stilled in the art that it is not so limited but is susceptible to various changes without departing from the scope of the invention. For example, although the dimples of the coiled tubing are shown only for supporting the weight of electical pump power cable, they have other uses. There are many downhole tools installed and retrieved within well tubulars that depend upon no-go stops to locate or anchor the tools within the pipe or tubing ID. In threaded pipe, short nipples with such ID profiles are made up into the pipe string as it is run into the well. With coiled tubing such short pieces can be spliced into the tubing by welding or with several types of special tubing connectors. Such splicing compromises the structural and pressure integrity of the tubing and often results in problems handling and running the coiled tubing with standard equipment. The dimples of this invention can be formed into the tubing in the field at whatever desired location and do not compromise the integrity or handling of the coiled tubing. The dimples can serve as no-go stops to locate, selectively locate or anchor down-hole tools. Such tool and dimple combinations are limited only by the imagination of the designer.

We claim:

1. An apparatus for installation in a well for transmitting power to a well pump, comprising:

a tubing having an interior passage;

an electrical cable having at least one insulated electrical conductor embedded within an elastomeric jacket, the electrical cable extending longitudinally through the interior passage of the tubing;

at least one retainer mounted to the electrical cable and having at least one load shoulder; and at least one indentation formed in the tubing adjacent the load shoulder, the indentation protruding into the interior passage of the tubing and creating a ledge which is contacted by the load shoulder when the apparatus is installed in the well to transfer weight of the electrical cable to the tubing.

2. The apparatus according to claim 1, wherein the retainer comprises at least two portions which are clamped together around the electrical cable by fasteners.

3. The apparatus according to claim 1, wherein the load shoulder is located on an end of the retainer.

4. The apparatus according to claim 1, wherein the indentation comprises a dimple having a dimple axis which is perpendicular to a longitudinal axis of the tubing.

5. The apparatus according to claim 1, wherein the indentation has a depressed exterior surface which is filled with a rigid material.

6. The apparatus according to claim 5, wherein the rigid material is weld material.

7. The apparatus according to claim 1, wherein said at least one indentation comprises at least one set of dimples formed in the tubing adjacent the load shoulder, the dimples within the set being spaced apart circumferentially around the tubing.

8. The apparatus according to claim 7 wherein:

each of the dimples within the set has an axis, the axes of the dimples within the set being located in a common plane which is normal to a longitudinal axis of the tubing; and each of the dimples has a depressed exterior surface which is filled with a rigid material.

9. The apparatus according to claim 1, wherein said at least one indentation comprises a primary set and a secondary set of dimples formed in the tubing below the load shoulder of the retainer, the dimples within each of the sets being spaced apart circumferentially around the tubing, the primary and secondary sets for the load shoulder being spaced longitudinally apart from each other.

10. The apparatus according to claim 1 wherein:

the retainer has an opposite shoulder facing oppositely from the load shoulder; and wherein one of said at least one indentation is formed in the tubing adjacent the opposite shoulder.

11. An apparatus for installation in a well for transmitting power to a well pump, comprising:

a continuous metal tubing having an inner diameter;

an electrical cable having at least one insulated electrical conductor embedded within an elastomeric jacket, the electrical cable extending longitudinally through the tubing;

at least one retainer mounted to the electrical cable and having an outer diameter which is less than the inner diameter of the tubing; and at least one primary set of dimples integrally formed in the tubing, the dimples within the primary set being spaced circumferentially apart from each other and protruding into the tubing a distance which circumscribes a clearance diameter which is less than the outer diameter of the retainer, creating ledges which are engaged by the retainer when the apparatus is installed in the well.

12. The apparatus according to claim 11, wherein there are at least three of the dimples within the primary set, each of the dimples being circular and having an axis, the axes of the dimples within the primary set being in a common plane normal to a longitudinal axis of the tubing.

13. The apparatus according to claim 12, wherein the retainer comprises at least two portions which are clamped together around the electrical cable by fasteners.

14. The apparatus according to claim 11, wherein said at least one primary set of dimples comprises a pair of primary sets of the dimples, one of the primary sets being located adjacent to each end of the retainer.

15. The apparatus according to claim 14, wherein a longitudinal distance between the primary sets of dimples for the retainer is greater than a length of the retainer to allow limited longitudinal movement of the retainer in the tubing relative to the dimples.

16. The apparatus according to claim 11, wherein each of the dimples has a depressed exterior surface which is filled with a rigid material.

17. The apparatus according to claim 16, wherein the rigid material is weld material.

18. The apparatus according to claim 11, further comprising:

at least one secondary set of dimples formed in the tubing, the secondary set being spaced longitudinally a short distance from the primary set, the dimples within each of the adjacent primary and secondary sets being staggered circumferentially from each other.

19. A length of coiled tubing for use in a well, comprising:
at least one indentation integrally formed in the tubing, the indentation having an interior surface protruding into an interior passage of the tubing for creating a ledge; and wherein
the indentation creates an exterior depression which is filled with an inlay of rigid material to prevent the interior surface of the indentation from flattening while running the tubing in and out of the well.

20. The coiled tubing according to claim 19, wherein the indentation is a dimple having a dimple axis which is perpendicular to a longitudinal axis of the tubing.

21. The coiled tubing according to claim 19, wherein the rigid material is steel weld material.

22. The coiled tubing according to claim 19, wherein the indentation is a circular dimple, and the rigid material is steel weld material.

23. The coiled tubing according to claim 19 wherein said at least one indentation comprises a plurality of dimples spaced around a circumference of the tubing in a common plane perpendicular to an axis of the tubing.

24. The coiled tubing according to claim 19, wherein each of the dimples is circular and the rigid material is steel weld material.

25. A method of installing an electrical cable within tubing for use in a well, the electrical cable having at least one insulated electrical conductor embedded within an elastomeric jacket, comprising:
(a) mounting at least one retainer to the electrical cable, the retainer having a load shoulder which is adapted to face downward when installed within a well;
(b) inserting the electrical cable into the tubing; and
(c) locating the retainer within the tubing and forming at least one load supporting indentation in the tubing adjacent to and spaced a short distance from the load shoulder, the load supporting indentation protruding into the tubing to create a ledge for engagement by the load shoulder when the tubing is installed within the well.

26. The method according to claim 25, wherein step (a) further comprises providing the retainer with an opposite shoulder which is adapted to face upward when installed within the well; and wherein the method further comprises:
forming at least one indentation in the tubing adjacent to and spaced a short distance from the opposite shoulder for engagement by the opposite shoulder.

27. A method of deploying coiled tubing in a well, comprising:
(a) forming at least one indentation in the tubing, creating an interior surface which protrudes into an interior passage of the tubing for creating a ledge; and
(b) filling an exterior depression created by the indentation with an inlay of rigid material; then
(c) running the tubing into the well.

28. The method according to claim 27, wherein step (b) comprises filling the depression with a weld material.

29. The method according to claim 27, further comprising inserting a member into the tubing and supporting the member on the ledge after step (d).

30. An apparatus for installation in a well for transmitting power to a well pump, comprising:
a tubing having an interior passage and a longitudinal axis;
an electrical cable having at least one insulated electrical conductor embedded within an elastomeric jacket and an armor comprising a metal strip wrapped helically around the jacket, the electrical cable extending longitudinally through the interior passage of the tubing; and
at least one dimple formed in the tubing, the dimple having a depressed exterior surface which is filled with a rigid material and protruding into the interior passage of the tubing sufficiently to transfer any tensile load on armor of the cable through the dimple to the tubing.

31. The apparatus according to claim 30 wherein the rigid material is weld material.

32. An apparatus for installation in a well for transmitting power to a well pump, comprising:
a tubing having an interior passage and a longitudinal axis;
an electrical cable having at least one insulated electrical conductor embedded within an elastomeric jacket and an armor comprising a metal strip wrapped helically around the jacket, the electrical cable extending longitudinally through the interior passage of the tubing; and
at least one dimple formed in the tubing, the dimple protruding into the interior passage of the tubing sufficiently to transfer any tensile load on said armor of the cable through the dimple to the tubing; wherein
the dimple is conical and has a dimple axis which is perpendicular to the longitudinal axis of the tubing; and wherein
the dimple defines a conical depression on an exterior surface of the tubing which is filled with weld material.

33. A method of installing electrical cable within coiled tubing for use in a well, the electrical cable having at least one insulated electrical conductor embedded within an elastomeric jacket, the jacket being enclosed in an armor of a metal wrap, comprising:
(a) inserting the electrical cable into the tubing while the tubing is located on the surface; then
(b) forming at least one dimple in the tubing which protrudes into an interior passage of the tubing and secures the cable against longitudinal movement;
(c) filling an exterior depression caused by the dimple with an inlay of rigid material; then
(d) running the tubing into the well.

* * * * *

UNITED STATES PATENT AND TRADEMARK OFFICE
CERTIFICATE OF CORRECTION

PATENT NO. : 6,143,988
DATED : Nov. 7, 2000
INVENTOR(S) : David H. Neuroth, et al It is certified that error appears in the above-identified patent and that said Letters Patent is hereby corrected as shown below:

Column 3, Line 4, please delete Nitrile"and insert --nitrile--.

Column 3, Line 57, please delete "optionally" and insert --Optionally--.

Column 5, Line 11, please delete "stilled" and insert --skilled--.

Signed and Sealed this

Eighth Day of May, 2001

Attest:

NICHOLAS P. GODICI

Attesting Officer          Acting Director of the United States Patent and Trademark Office